R. L. WALLACE.
LIME JUICE EXTRACTOR.
APPLICATION FILED AUG. 17, 1914.

1,129,254.

Patented Feb. 23, 1915.

WITNESSES:
John A. Naismith
J. B. Cambers

INVENTOR
Robert L. Wallace
BY F. C. Bates
HIS ATTORNEY

UNITED STATES PATENT OFFICE.

ROBERT L. WALLACE, OF SAN JOSE, CALIFORNIA.

LIME-JUICE EXTRACTOR.

1,129,254.  Specification of Letters Patent.  Patented Feb. 23, 1915.

Application filed August 17, 1914. Serial No. 857,138.

*To all whom it may concern:*

Be it known that I, ROBERT L. WALLACE, a citizen of the United States, residing at San Jose, in the county of Santa Clara and State of California, have invented certain new and useful Improvements in Lime-Juice Extractors, of which the following is a specification.

My invention relates to lime juice extractors, and the object of my invention is to produce a simple, convenient, sanitary, and effective device for extracting the juice of the lime, particularly when compounding drinks containing fresh lime juice.

The particular construction and combination of parts used in my device are shown in the accompanying drawings, in which—

Figure 4:
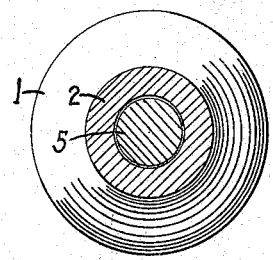
Figure 1:
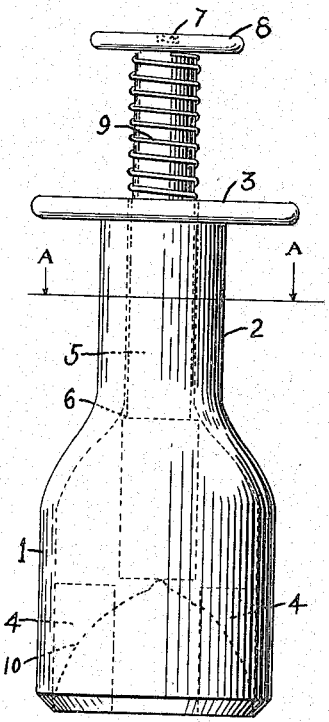
Figure 3:
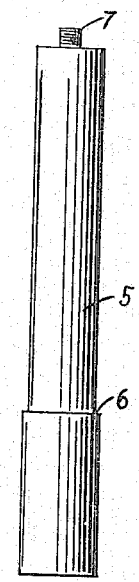
Figure 2:
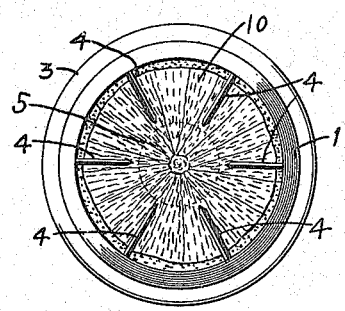

Figure 1 is a side elevation of my improved lime juice extractor. Fig. 2 is a bottom plan view of the same. Fig. 3 is a detail elevation of the plunger. Fig. 4 is a cross section on line A—A of Fig. 1.

Similar reference numerals refer to similar parts throughout the several views.

Referring now more particularly to the drawings, 1 indicates the main body portion of my device, made of cast metal or any other suitable material, having a neck 2 formed on the upper portion thereof, and an outwardly projecting flange 3 formed on the upper end of said neck 2. Main body portion 1 is made in the form of a hollow cylinder and is adapted to be placed in a drinking-glass. Radially positioned about the interior of said body portion 1, and preferably an integral part thereof, are a plurality of blades 4. These blades 4 extend a distance inwardly and toward the center of said main body portion 1, but leave a sufficient space in the center thereof to permit the operation of a plunger as 5. The lower and inner edges of said blades 4 are sharpened and thereby adapted to cut the half of a lime, as 10, into segments as hereinafter described, said blades 4 extending from the extreme lower edge of said main body portion 1 to a point approximately midway between said lower edge and the juncture of said main body portion 1 and said neck 2. Neck 2 is also made in the form of a hollow cylinder and is adapted to receive the upper portion or stem of plunger 5. The lower portion of plunger 5 is of the required size to reciprocate freely in the central portion of said main body portion 1 between said blades 4, and form a shoulder, as 6, at its point of junction with the upper portion or stem of said plunger 5. The upper end of said plunger 5 is provided with a threaded pin 7 to receive a push-plate 8. Spring 9 is placed on the stem of plunger 5 between said neck 2 and said push-plate 8 and serves to automatically return said plunger 5 to its position after the same has been used as hereinafter described.

In using my device, a lime is cut in halves and one of said halves, as 10, is placed flat side down as shown in Fig. 1. My device is now placed over said lime 10 and pressed downward, causing blades 4 to cut through the skin and pulp of said lime and dividing the same into segments as shown in Figs. 1 and 2. The device is now placed in a glass and pressure applied to plunger 5, whereupon said lime 10 is squeezed downward against the bottom of said glass and the juice forced out into said glass. When the pressure is removed from said plunger 5, spring 9 returns the same to its original position with shoulder 6 against the lower end of neck 2. Blades 4 fulfil a threefold purpose, viz.—first cutting through the skin and pulp of the lime and aiding in freeing the juice therein; secondly, holding said lime while the same is being placed in a glass; thirdly, holding said lime while the same is being removed and thrown away.

Having thus described my invention, what I claim as new and desire to secure by Letters Patent, is:

A lime juice extractor comprising a hollow cylinder adapted to be placed in a drinking-glass and having a plurality of cutting blades positioned about the inner circumference of the lower end thereof and extending a distance toward the center thereof and a hollow cylindrical neck formed on the upper end thereof, an outwardly projecting flange formed on the upper edge of said neck, a plunger operatively positioned in said cylinder and said neck having a shoulder formed thereon adapted to engage the lower end of said neck, said plunger having a push-plate secured to the upper end thereof and a spring disposed on its upper end between said push-plate and the upper end of said cylindrical neck, substantially as shown and described.

In testimony whereof I have hereunto affixed my signature in presence of two subscribing witnesses.

ROBERT L. WALLACE.

Witnesses:
JOHN A. NAISMITH,
J. B. CAMBERS.

Copies of this patent may be obtained for five cents each, by addressing the "Commissioner of Patents, Washington, D. C."